United States Patent [19]

Kolenc

[11] Patent Number: 5,253,671
[45] Date of Patent: Oct. 19, 1993

[54] HIGH PRESSURE DIAPHRAGM VALVE

[75] Inventor: Terrence J. Kolenc, Mentor, Ohio

[73] Assignee: Nupro Company, Willoughby, Ohio

[21] Appl. No.: 947,428

[22] Filed: Sep. 18, 1992

Related U.S. Application Data

[63] Continuation-in-part of Ser. No. 888,897, May 26, 1992.

[51] Int. Cl.⁵ .............................................. F16K 7/17
[52] U.S. Cl. ..................................... 137/315; 92/13;
   92/13.41; 92/130 A; 92/130 D; 92/140;
   74/110; 74/519; 251/58; 251/63.5; 251/331
[58] Field of Search ................ 137/315; 251/58, 63.5,
   251/63.6, 214, 331, 335.2; 92/13, 130 A, 130 D,
   140, 13.41; 74/107, 110, 519

[56] References Cited

U.S. PATENT DOCUMENTS

| Re. 30,989 | 7/1982 | Bake et al. ..................... 251/335.2 |
| 566,452 | 8/1896 | Foster ................................. 251/58 |
| 1,047,506 | 12/1912 | Dawson ............................. 251/58 |
| 1,628,566 | 5/1927 | Williams .......................... 251/225 |
| 1,948,628 | 2/1934 | Penick et al. .................... 251/359 |
| 2,382,235 | 8/1945 | Lamar ............................ 251/335.2 |
| 2,533,965 | 12/1950 | Schmohl et al. ................ 251/331 |
| 2,621,011 | 12/1952 | Smith .............................. 251/359 |
| 2,856,148 | 10/1958 | Heathcote et al. ............. 251/360 |
| 3,232,182 | 2/1966 | Gilbert ........................... 92/13.41 |
| 3,294,408 | 12/1966 | Smith ........................... 251/335.2 |
| 3,310,282 | 3/1967 | Boteler ............................ 251/331 |
| 3,318,577 | 5/1967 | Banks .............................. 251/360 |
| 3,487,823 | 1/1970 | Tarter et al. ..................... 251/359 |
| 3,945,302 | 3/1976 | Downs ............................ 92/13.41 |
| 3,958,592 | 5/1976 | Wells et al. ..................... 251/63.6 |
| 3,982,729 | 9/1976 | Tricini ............................. 251/214 |
| 4,094,231 | 6/1978 | Carr ............................... 92/13.41 |
| 4,177,681 | 12/1979 | Wess .............................. 92/13.41 |
| 4,245,661 | 1/1981 | McGee ............................ 251/214 |
| 4,343,456 | 8/1982 | Zitzloff ........................... 251/335.2 |
| 4,470,430 | 9/1984 | Lancaster ....................... 251/214 |
| 4,549,719 | 10/1985 | Baumann ........................... 251/58 |
| 4,609,178 | 9/1986 | Baumann ......................... 251/251 |
| 4,684,103 | 8/1987 | Baumann ........................... 251/58 |
| 4,729,544 | 3/1988 | Baumann ......................... 251/331 |
| 4,744,386 | 5/1988 | Frazer ............................. 251/63.6 |
| 4,791,856 | 12/1988 | Heim et al. ..................... 251/63.6 |
| 4,828,219 | 5/1989 | Ohmi et al. ..................... 251/63.5 |
| 4,867,201 | 9/1989 | Carten .......................... 251/335.2 |
| 4,875,404 | 10/1989 | Aldridge ........................ 92/130 A |
| 5,040,768 | 8/1991 | Minami et al. .................. 92/13.41 |

FOREIGN PATENT DOCUMENTS

| 1003157 | 2/1957 | Fed. Rep. of Germany ........ 251/58 |
| 1450523 | 12/1968 | Fed. Rep. of Germany ...... 251/214 |
| 3810447 | 11/1989 | Fed. Rep. of Germany ...... 251/359 |
| 179118 | 8/1962 | Sweden ............................... 251/58 |

Primary Examiner—George L. Walton
Attorney, Agent, or Firm—Fay, Sharpe, Beall, Fagan, Minnich & McKee

[57] ABSTRACT

A diaphragm valve for high pressure use has a metal diaphragm which is actuated into and out of direct engagement with a valve seat by an air operator acting through a force multiplying lever assembly. The valve seat is confined by rigid interior and exterior sleeves while the sealing surface is contoured to have a concave configuration corresponding to the contour of the diaphragm in its deflected position. The air operator is provided with a stroke adjustment mechanism that is locked in adjusted position by a member that is generally accessible only when the operator is disconnected from the valve.

8 Claims, 4 Drawing Sheets

HIGH PRESSURE DIAPHRAGM VALVE

BACKGROUND OF THE INVENTION

This application is a continuation-in-part application of U.S. application Ser. No. 07/888,897, filed May 26, 1992, for "High Pressure Diaphragm Valve".

The subject invention is directed toward the valve art and, more particularly, to an improved air operated diaphragm valve.

The valve is particularly suited for use as a shut-off valve for high pressure, toxic gases as used in the semiconductor industry and will be described with reference thereto; however, as will become apparent, the valve could be used in other environments for other purposes.

The high pressure and toxic gases used as process gases in the semi-conductor industry require highly reliable valves. Reliability is measured by the ability to contain the system fluid and shut off the flow of the fluid. The semi-conductor industry has chosen packless (metal membrane) valves to provide the desired level of reliability and safety. Currently diaphragm type packless valves are preferred because they are easier to clean and faster to purge due to their lower internal volume (compared to bellows valves).

The size of the diaphragm needed is controlled by the flow and cycle life requirements of the valve. In a high pressure system, the size of diaphragm needed requires a large amount of force to overcome the pressure load of the system fluid on the diaphragm. In the majority of applications for the subject valve, the operator must produce this large force while remaining within limitations on the size of the package and the pressure available to actuate the operator. In order to meet all of these requirements, some type of force multiplying mechanism is needed between the valve element and operator.

Precise control of the force output of the operator is needed. If the force output is too low, the operator will not be able to overcome the pressure load on the diaphragm and shut off the flow. If the force output is too high, the valve may not open with the pressure available to actuate the valve.

To produce high reliability, precise control of the up and down stroke movement of the diaphragm is needed. In the case where a deformable seat material is used, good containment of the material is needed to minimize deformation that would result in increased diaphragm movement, which would decrease cycle life.

Because of the above-noted factors, there is an ongoing need to improve the valves and to increase seat and diaphragm life through better control and design of the relationships between the various components including the force multiplying mechanism and the stroke adjustment mechanism.

BRIEF DESCRIPTION OF THE INVENTION

In accordance with a first aspect of the invention, a valve particularly suited for high pressure operation is provided and includes a valve body defining a valve chamber with a first interior wall having a first port extending therethrough to the exterior of the body. A flexible metal diaphragm seals the chamber and is positioned to extend across the chamber at a location spaced from the first wall and aligned with the first port. A seat assembly is associated with the first port for cooperation with the diaphragm for controlling flow through the first port. The seat assembly includes a resilient annular seat ring positioned in the chamber at a location to surround the first port. The seat ring is provided with a seal surface which faces the diaphragm for engagement therewith. Encircling the seat ring and maintaining it located relative to the first port is a retaining ring member which extends upwardly adjacent the exterior of the seat ring. Positioned closely within the seat ring and extending from the first wall to the seal surface is a rigid metal sleeve arranged to prevent inward deflection of the seat ring and consequently also limiting axial deformation of the seat. Actuating means are provided for selectively deflecting the diaphragm into engagement with the seal surface. The seal surface is contoured to have an arcuate concave shape selected to correspond to the natural shape of the diaphragm when the diaphragm is moved into a position of engagement with the seal surface.

By making the seal surface contoured to the normal deflected shape of the diaphragm, an improved seal results. Additionally, loading of the seat is more uniform, and the life of the diaphragm is increased because it is a natural shape.

In accordance with a further, more limited aspect, the rigid metal sleeve is axially supported by the first wall and closely encircles the first port. Preferably, the sleeve extends substantially the full height of the seat ring to provide containment and prevent inward deflection of the seat ring during valve closing. This, of course, allows the diaphragm movement to be extremely short, thereby extending diaphragm life.

In accordance with a further aspect of the invention, there is provided a valve which includes a valve body defining a valve chamber having inlet and outlet ports connecting the chamber with the exterior of the body. A valve element is positioned for controlling flow through the chamber between the inlet and outlet ports. Positioned to operate the valve element is an expansible fluid motor operator assembly including a reciprocated element for moving the valve element between open and closed positions. The operator assembly includes a bonnet and a connector member releasably connecting the bonnet member to the valve body. Associated with the bonnet member for permitting adjustment of the stroke of the reciprocated member are adjustment means and lock means for fixing the adjustment means in a predetermined position. The lock means is located such that it is incapable of being released when the bonnet member is connected to the valve body. This arrangement prevents unauthorized tampering with the stroke adjustment mechanism which also controls force output of the operator. Additionally, it limits field adjustment of the stroke such as would be the case if the lock means were readily accessible. Only by actually removing the bonnet connection is it possible to obtain access to the lock means.

Preferably, and in accordance with a more limited aspect of the invention, the adjustment means for permitting adjustment of the stroke and force of the reciprocated member comprises a threaded connection between a base member releasably joined to the bonnet member and the bonnet member itself. Also, it is preferred that the lock means merely comprise a selectably movable member for preventing movement of the threaded connection between the base member and the bonnet member. In one form, the lock means comprises a set screw which engages between the base member and the bonnet member to prevent movement of the threaded connection. This set screw is enclosed by a bonnet nut which connects the bonnet to the valve body.

In accordance with a further aspect of the invention, there is provided a valve which includes a valve body defining a valve chamber with inlet and outlet ports and a valve member movable between first and second positions for controlling flow through the chamber between the inlet and outlet ports. An expansible chamber fluid motor assembly is releasably connected with the valve body for selectively moving the valve member between the first and second positions. Preferably, the fluid motor assembly comprises a cylinder housing having first and second axially spaced end walls with an actuator rod mounted for reciprocation and extending through the first end wall into operative engagement with the valve member. A piston is slidable in the chamber and defines therewith a pressure chamber between the piston and the first end wall with biasing means for maintaining the cylinder under a continuous bias toward the first end wall. Of importance to this invention are force multiplying means in the pressure chamber between the piston in the first end wall for transmitting force from the piston to the actuator rod. Preferably, the force multiplying means include a pair of elongated levers each terminating in first and second opposed ends with the first end of each lever pivotally mounted adjacent the first end wall at generally diametrically opposed positions. The second end of each lever is located in sliding engagement with the piston at a location diagonally of its respective pivotal connection. An intermediate portion on each lever between its first and second ends is in driving engagement with the actuator rod. Preferably, there is a balance plate member between the levers and the actuator rod for transmitting forces between the intermediate portion of each lever and the actuating rod. In this arrangement, the intermediate portion of each lever engages the balance plate at a location equidistant from the axis of the actuator rod. This arrangement provides high force multiplication over a short distance as required by the diaphragm while allowing the overall size of the actuation assembly to remain small.

Preferably, and in accordance with a further aspect of the invention, the levers are mounted to pivot in side-by-side parallel planes and the second ends of the levers engage the piston at points located generally on a diagonal line passing through the axis of the actuator rod. This arrangement results in an extremely compact and highly effective force transmitting and multiplying mechanism such that a short high force movement can be generated with relatively low pressure actuating fluid.

In accordance with a further aspect of the invention, a valve of the type having a valve chamber with a valve seat therein is provided with an improved assembly for controlling flow through the valve seat. The improved assembly comprises a movable diaphragm means including a plurality of layers of flexible diaphragm members with a first of the diaphragm members being exposed to the interior of the valve chamber and a second diaphragm member in contact with the first diaphragm and coextensive therewith on the side opposite the valve chamber to move with and provide backing for the first diaphragm member. A bleed means is provided to prevent pressure build-up between the first and second diaphragm members and undesired movement of the first diaphragm member toward the seat in the event the first diaphragm develops a leak.

As can be seen from the foregoing, a primary object of the invention is the provision of an air operated diaphragm valve which is capable of reliably controlling high pressure fluids.

Another object is the provision of a diaphragm valve of the general type described which is provided with an arrangement to produce a forced mode of failure.

Still another object is the provision of a diaphragm assembly for valves of the type under consideration wherein the diaphragm assembly is designed to produce a desired mode of failure.

A further object is the provision of a valve of the type discussed wherein the seat and diaphragm are arranged to sealingly engage uniformly over the natural shape of the diaphragm in its deflected condition.

Yet another object of the invention is the provision of a highly reliable diaphragm valve with a fluid motor operator that is arranged to provide a high force output over a short, closely controlled stroke.

An additional object is the provision of a valve of the general type discussed wherein the output stroke of the operator can be adjusted only when the operator is disconnected from the valve body.

A still further object is the provision of a valve of the type described which is designed to assure a long diaphragm life.

BRIEF DESCRIPTION OF THE DRAWINGS

The above and other objects and advantages will become apparent from the following description when read in conjunction with the accompanying drawings wherein.

DETAILED DESCRIPTION OF THE PREFERRED EMBODIMENTS

Figure 1:
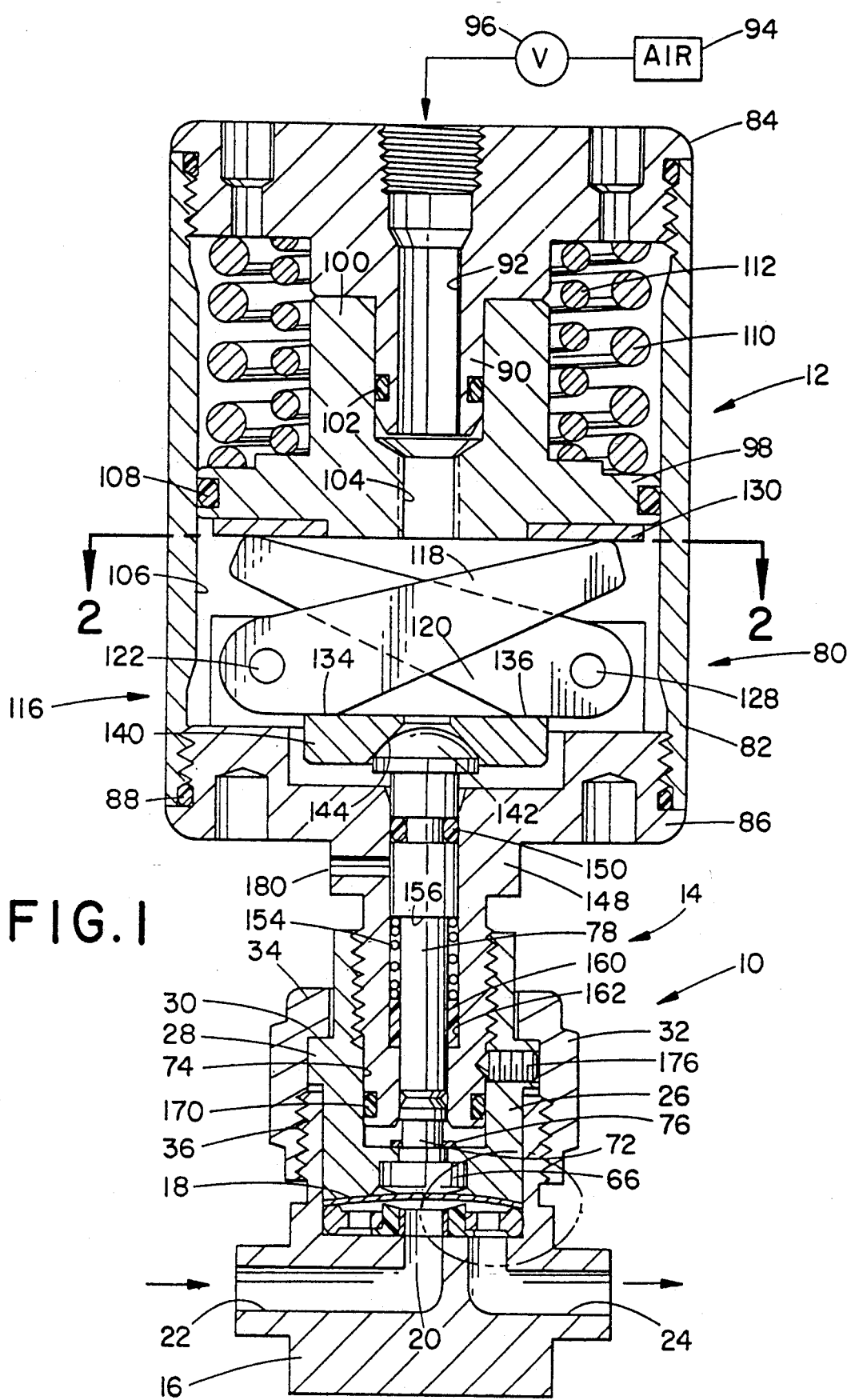
FIG. 1 is a vertical cross-sectional view through a valve constituting a preferred embodiment of the subject invention.

Referring more particularly to the drawings wherein the showings are for the purpose of illustrating a preferred embodiment of the invention only, and not for the purpose of limiting same, FIG. 1 shows the overall arrangement of an air operated high pressure shut-off valve comprising a body and valve assembly 10 which is operated by an air actuated fluid motor operator assembly 12. The operator assembly 12 is connected to the body and main valve assembly 10 by a releasably and adjustable bonnet arrangement 14.

The main valve assembly 10 comprises a main body element 16 which is formed from any suitable material such as, for example, stainless steel. The body assembly 16 has a main inwardly extending chamber 18 which extends axially into the body from the upper end thereof. Chamber 18 is of generally cylindrical configuration and has an inlet opening port 20 extending axially into the chamber 18 and connecting to the exterior of the body through an inlet passage 22. The chamber 18 also communicates with the exterior of the body through an outlet passage 24. The inlet and outlet passages 22, 24 could be provided with any particular desired type of end fittings for allowing them to be connected to associated piping and flow systems.

The open upper end of the chamber 18 is closed by a bonnet member 26 which is of generally cylindrical configuration and extends into the chamber 18 in close sliding relationship with the interior wall thereof. A radially extending flange 28 formed about the central section of the bonnet member 26 and provides an upwardly facing shoulder surface 30. A female bonnet nut member 32 is received on the bonnet member 26 and has an inwardly extending flange portion 34 that bears against the shoulder 30. Cooperating threads 36 between the interior of the nut 32 and the exterior of the body about the chamber 18 provide means for releasably connecting the nut member and the bonnet 26 in position.

Figure 3:
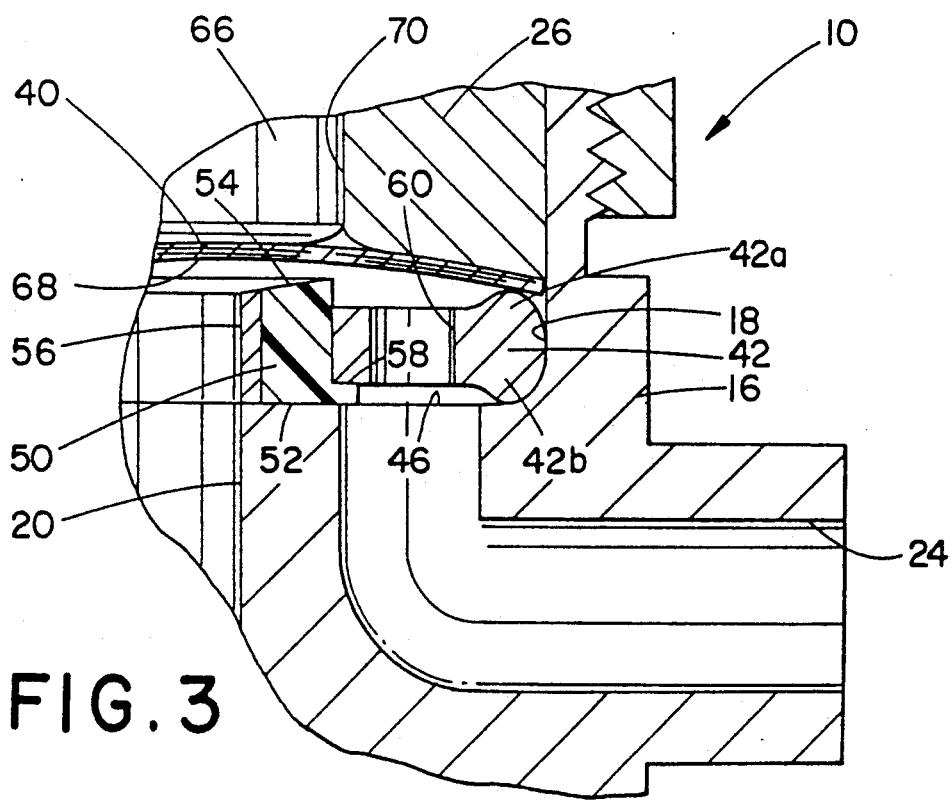
FIG. 3 is a greatly enlarged view of the circled area of FIG. 1.

The chamber 18 is sealed by a transversely extending diaphragm member 40 that extends completely across chamber 18 and has a peripheral edge portion sealingly clamped to a ring member 42. The arrangement of ring member 42 will subsequently be described in some detail; however, for the present, attention is directed to FIG. 3 wherein the relationship of the diaphragm 40 to the remaining elements within chamber 18 can best be understood. It should be noted that many different types of diaphragm members could be used. In the subject embodiment, however, a multi-layered metal diaphragm is preferred. Specifically, in this embodiment, the diaphragm 40 is formed from five layers of a cobalt, nickel, chromium alloy such as Elgiloy alloy, each about 0.005 inch in thickness. The diaphragm 40 has a slightly convex configuration best shown in FIG. 3. Similarly, the lower end of the bonnet element 26 is similarly provided with a somewhat concave curvalinear shape as illustrated in FIG. 3. The edge portion of the diaphragm 40 is sealingly clamped continuously about its periphery to a bead 42a on the ring 42. A similar bead 42b extends downwardly from ring 42 and engages the bottom wall 46 of chamber 18. This completely seals the chamber 18 and, in a manner which will subsequently be described, allows the diaphragm 40 to function as the valving element. In this regard, it should be noted that the subject embodiment uses an annular resilient seat element 50 which is positioned about the inlet passage or port 20 with its bottom wall 52 resting against the bottom wall 46 of chamber 18. The ring 50 is formed from any suitable resilient material having the characteristics and properties necessary for the particular materials which the valve is intended to handle. In the subject embodiment, the ring 50 has a planar bottom wall and upwardly extending parallel side walls which are joined at their upper end by a seal surface 54. The seat ring 50 is positioned in axial alignment with the inlet passage or port 20 generally as shown.

Positioned closely within the seat ring 50 and resting against the bottom wall 46 of chamber 18 is a rigid metal sleeve element 56. The sleeve 56 is formed from any suitable metal, such as stainless steel, and extends from wall 46 upwardly nearly to the seal surface 54. The ring 56 is frictionally retained in place by a tight fit with the interior of the seat ring 50.

Referring again to the metal ring 42, it will be seen that this ring acts to retain the seat ring 50 in place and to cause the seat ring 50 to sealingly engage the bottom wall 46 of chamber 18. Specifically, the seat ring 50 includes a peripherally continuous and radially extending lower flange or collar section 58 which extends outwardly under the interior portion of the lower face of ring 42 as illustrated in FIG. 3. Thus, when the bonnet member 56 is actuated downwardly by tightening of the bonnet nut 32, forces are applied to compress the flange section 58 and to drive it into sealing engagement with the bottom wall 46 of chamber 18. With respect to this, it should be noted that ring 42 also includes a plurality of circumferentially spaced, transversely extending through openings 60. These openings provide a flow path so that flow entering the chamber 18 through the inlet 20 can flow outwardly to the outlet 24. Additionally, it should be noted that the ring 42 is raised above the bottom wall 46 and its central area so that flow, after coming through the opening 60, can flow through this raised area to the outlet 24.

Figure 4:
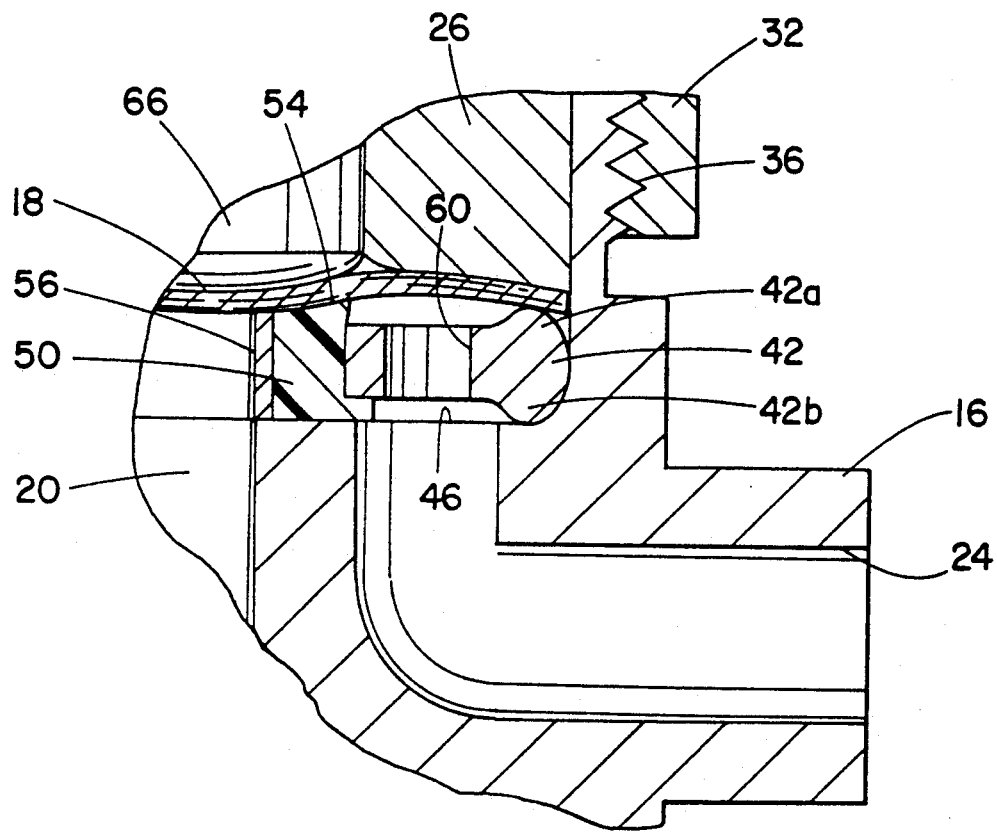
FIG. 4 is a view similar to FIG. 3 but showing the valve in its closed position.

It should be noted that the thickness of the ring 42 is such that it extends upwardly a significant portion of the total height of the seat ring 50. Thus, the seat ring 50 is confined between the inner sleeve 56 and the ring 42. The seal surface 54 which lies above the maximum height of the sleeve 56 and the ring 42 is, according to the subject invention, contoured to closely correspond to the normal shape of the diaphragm 40 when it is deflected downwardly into sealing engagement with surface 54. In the subject embodiment, this particular shape is best shown in FIG. 4 which illustrates the valve in its closed position with diaphragm 40 deflected downwardly into engagement with the seal surface 54. Note that the diaphragm is moved downwardly by an actuator button member 66 which has a somewhat rounded or contoured lower face 68 that is likewise shaped and controlled so as to have the general shape of the normal deflection pattern of the diaphragm 40. In this manner, the contact between the seal surface 54 and the under surface of the diaphragm 40 is a relatively uniform contact throughout the entire seal area. The confined nature of the seal because of the presence of the sleeve 56 and the ring 42 assures that the resilient seat 50 will not deform or deflect in an undesirable manner to vary the contact between the diaphragm and the seal surface. Additionally, by so confining the seat ring 50, the height to surface 54 remains constant preventing the diaphragm from being overstressed due to excessive deflection of the seat.

The actuator button 66 is, in the subject embodiment, formed from brass and is closely guided and received in an inwardly extending counterbore 70. A stem portion (see FIG. 1) 72 extends upwardly from the actuator button 66 into an upper chamber portion 74 carried in the bonnet member 26. The actuator button 66 and the stem 72 are retained in position by a snap ring 76 which engages about a reduced diameter portion of the stem 72. The upper end of the stem portion 72 is engaged by the lower end of an actuating rod member 78 which extends downwardly from the assembly 12.

Figure 2:
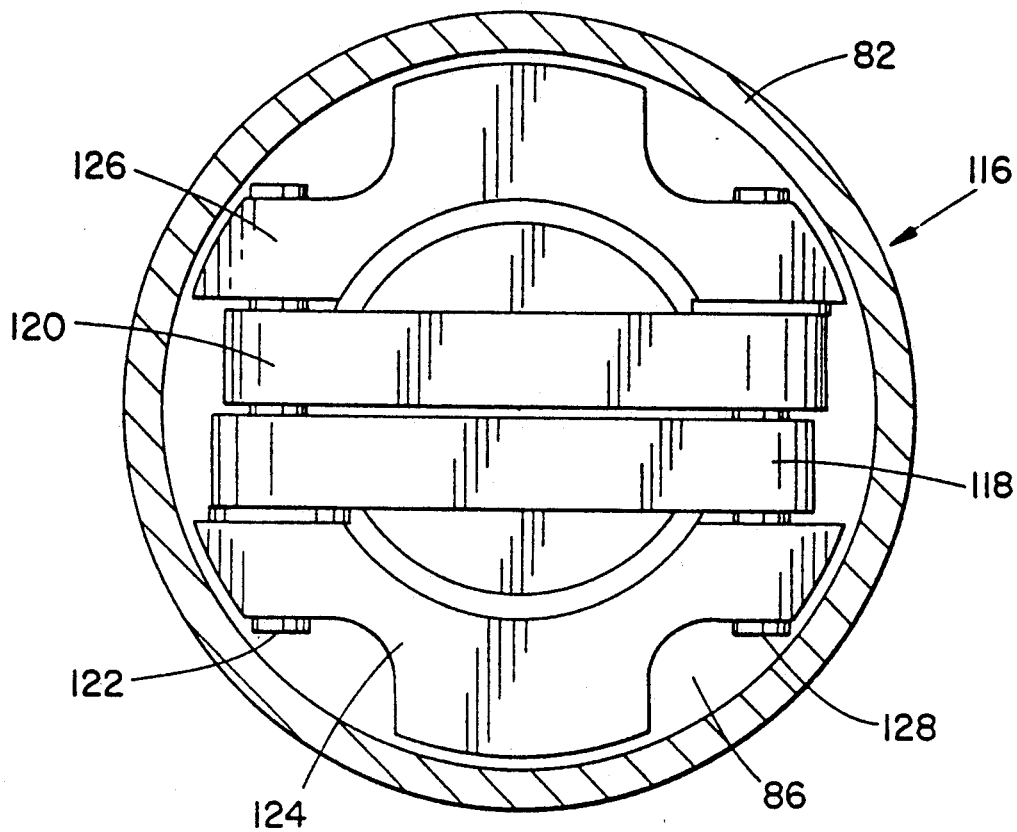
FIG. 2 is a cross-sectional view taken through line 2—2 of FIG. 1.

The arrangement of the actuating rod 78 and its relationship to the bonnet adjustment and connecting assembly 14 will subsequently be described in some detail. For the present, however, attention is directed to the actuator assembly 12 as best seen in FIGS. 1 and 2. As shown therein, the actuator assembly 12 comprises a power cylinder 80 which is formed by a tubular sleeve 82 preferably formed from a suitable metal such as aluminum and having upper and lower end walls 84 and 86 threadedly received in the opposite ends. The lower end wall 86 is sealingly joined to the lower end of the sleeve 82 and a suitable O-ring seal 88 seals the threaded connection between the end wall 86 and the sleeve 82.

The upper end wall 84 is a stepped diameter element with a small diameter central stem 90 formed axially and extending into the interior of the sleeve 82 as shown. A central flow passage 92 is formed inwardly of the end wall 84 axially through the stem portion 90. The passage 92 provides means for supplying a source of pressurized fluid to the interior of the cylinder 80. For this purpose, a diagrammatic illustration of an air supply source 94 and a control valve 96 are shown connected with passage 92.

Positioned within the cylinder 82 for axial sliding movement therein is a piston member 98 having a sleeve-like extension 100 which extends upwardly therefrom. The sleeve-like extension 100 closely receives the stem portion 90 of the upper end wall 84. A suitable O-ring 102 is carried in the extension 90 to seal between the extension 90 and the sleeve-like extension 100. Additionally, a central passage 104 provides communication from the passage 92 to a lower sealed chamber 106 in the cylinder 80. A suitable O-ring 108 seals about the periphery of the piston to assure that the chamber 106 is fully sealed.

The piston 98 is maintained under a continual relatively heavy downward bias by a pair of concentrically positioned compression springs 110 and 112, respectively. In the subject embodiment, the downward force on the piston 98 is normally conducted through to the actuator rod 78 by a motion multiplying mechanism 116. This mechanism includes a pair of lever elements 118 and 120 which are pivotally mounted from the lower wall 86. As best seen in FIG. 2, the lever members 118 and 120 extend in parallel side-by-side relationship. Their lower ends (as viewed in FIG. 1) are each separately mounted for pivotal movement about axes extending parallel equal distances on opposite sides of the central axis.

The lower end of the lever 118 is connected on a suitable pivot pin 122 which extends across the chamber 106 between support members 124 and 126 connected to the bottom wall 86. A similar pivot pin 128 extends parallel to pivot pin 122 at the opposite side of chamber 106 and pivotally receives the lower or right-hand end of lever 120. The opposite terminal end of each lever 118 and 120 extends diagonally upward to a location equally spaced on opposite sides of the central axis into engagement with the underside of the piston 98. Connected to the underside of piston 98 is a suitable wear plate 130 which is of generally annular configuration and extends circumferentially about the piston on the underside thereof. The wear plate is connected to the piston by being bonded or otherwise positively joined thereto. The downward movement of the piston 98 causes the lever 118 to be pivoted in a clockwise direction about its pivot pin 122. Similarly, lever 120 is pivoted in a counterclockwise direction as viewed in FIG. 1. Intermediate the two end portions of each of the levers 118 and 120 is an intermediate portion 134 and 136, respectively. These intermediate portions are closely adjacent the respective pivot 122, 128 and are located preferably at equal distances radially outward from the center axis. A suitable pressure plate element 140 is mounted on the upper end of the push rod 78 and is engaged by the portions 134 and 136. It will be seen that the upper end of actuator push rod 78 has an enlarged somewhat spherical head 142 which is received in a conical opening 144 in plate 140. This allows the plate 140 to tilt and shift slightly relative to the actuator rod 78.

The actuator rod 78 extends downwardly in an axial direction out of the chamber 106 through a neck portion 148 formed on the underside of the lower wall 86. The actuator rod 78 includes a centrally located seal ring 150 which seals about the rod while permitting reciprocatory movement relative thereto. It should be noted that the actuator rod 78 is maintained under a continual upward bias by a relatively light compression spring 154 which bears against a shoulder 156 formed on rod 78. The lower end of the compression spring 154 bears against a resilient guide ring 160 located in the counterbore 162.

The springs 112 and 110 which act to bias the piston 98 downwardly are of significantly greater force than the spring 154. Additionally, the arrangement of the motion multiplying mechanism 116 is such as to result in a significant amplification of the forces generated by the compression springs 110 and 112. This combined force tends to override the compression spring 154 and normally maintain the actuator rod 78 biased downwardly to force the valve to a closed position as illustrated in FIG. 4. Only when air from air supply source 94 is supplied to chamber 116 and the piston actuated upwardly against the bias of springs 110 and 112 can the spring 154 move the actuator rod upwardly to permit upward movement and opening of the diaphragm 40. This, of course, results because of the natural resiliency of diaphragm 40 causes it to move to the upward deflected position shown in FIGS. 1 and 3.

As can be appreciated from the foregoing, the actual movement of the actuator rod 78 to allow the valve to go from a full open to a full closed position is a relatively short motion. Because of the high forces generated and the short distance and actual motion between a full open and full closed position, the positioning of the rod and the actuator button 66 relative to the diaphragm is relatively critical and tolerance variations and the like in the manufacture of the actuator can result in relatively significant differences in the position of the actuator button. For this reason, the assembly is arranged so that the stroke can be adjusted to extremely close tolerances. To permit adjustment, the lower end of the extension 148 is threaded and is threadedly received in the bonnet member 26 as shown. A suitable seal 170 seals about the lower end of the extension 148 and by rotating the actuator 12 relative to the bonnet 26, the actual position of the actuator rod 78 in its fully extended position can be adjusted so that the maximum closure force acting against the diaphragm and the seat element can be finely adjusted. To perform this adjustment, the bonnet element and the actuator are removed from the valve and placed in a stand or test element device which is suitably arranged so that by final rotation of the actuator relative to the bonnet, the final maximum extended position and force output of the actuator button can be closely controlled. When the adjustment is proper, the further relative movement between the components is prevented by a locking means in the form of one or more set screws 176 which extends through the bonnet member 26 in threaded engagement therewith. By tightening the set screw 176, the extension 148 and the actuating assembly 12 are locked in position. Note that the set screw 176 is located such that when the assembly is placed in position on the valve body and the female bonnet nut tightened down, the set screw 176 is totally enclosed and cannot be released. This prevents unauthorized adjustment of the stroke. Only by actually removing the assembly from the valve body is it possible to adjust the stroke. This prevents persons from attempting to correct a leaky seat by applying greater closing forces through adjustment of the valve stroke. It should also be noted that the subject arrangement is such that if a leak should develop through the diaphragm 140, the seals 170 and 150 are located such as to provide a secondary or backup seal arrangement. Any leakage which takes place into the area between seals 170 and 150 can be monitored through the port 180. Suitable monitoring devices can be directly connected to this port as necessary or as desired.

Figure 5:
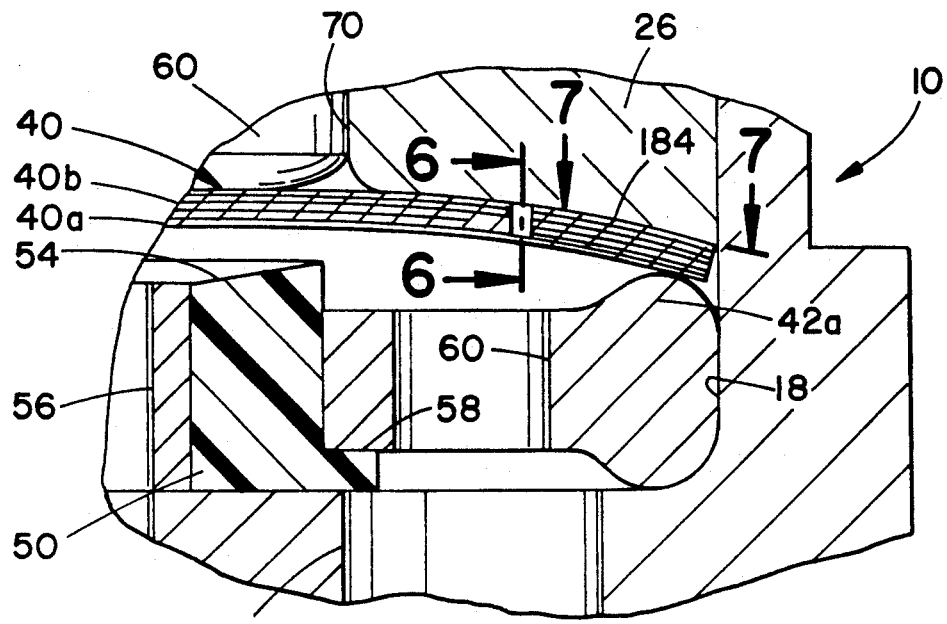
FIG. 5 is a greatly enlarged showing of the circled area of FIG. 3.
Figure 6:
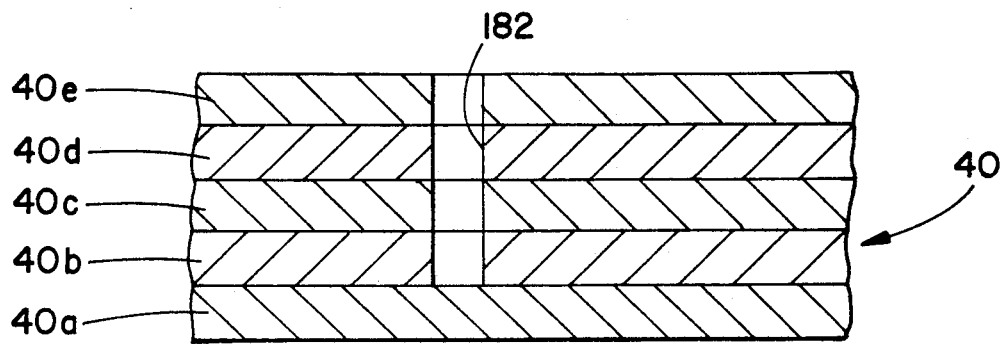
FIG. 6 is a view taken on line 6—6 of FIG. 5.

With respect to failure of the diaphragm assembly, it has been found that in dome shaped diaphragms of the type used herein, failure often occurs by cracking due to fatigue. Typically, the crack is located near a point corresponding to the outer diameter of the actuator button. When the diaphragm cracks, it is initially very small, in the nature of a micro-crack and cannot be seen with the naked, unaided eye. Generally, the crack forms first only through the innermost diaphragm layer 40a facing the seat surface 54 (see FIG. 5). If the valve is under pressure, the pressurized system fluid enters through the crack and gets between the bottom diaphragm layer 40a and the next superjacent layer 40b. This can then act to bias the bottom layer 40a downwardly against the seat surface 54 shutting off flow through the valve even though the valve operator is in the open position. This can create serious problems in certain types of systems.

In order to overcome the noted problem resulting from failure of the lowermost diaphragm layer, the subject device is provided with an arrangement for bleeding off the pressure between layers 40a and 40b by providing venting means. In particular, in the subject embodiment, the preferred form of venting means comprises very small diameter openings 182 formed through the upper diaphragm layers 40b, 40c, 40d, and 40e to permit any pressure from between layers 40a and 40b to be passed to the space above the diaphragm 40 and thus monitored through port 180. Because the pressure from between layers 40a and 40b is vented, there is no undesired closing of the layer 40a against seat surface 54.

As can be appreciated, openings 182 could be located at many positions on the upper diaphragm layers, however, it is preferable that they be located at a low stress area of the diaphragm. Further, it is highly preferable that they be relatively small, in the nature of only a few thousandths of an inch in diameter, so as not to affect the strength or stiffness of the diaphragm.

By venting the upper diaphragm layers in the manner described, the mode of failure of the valve can be forced to be one that is similar to that of more conventional valves which have been in use for an extended period of time and with which everyone is familiar.

Figure 7:
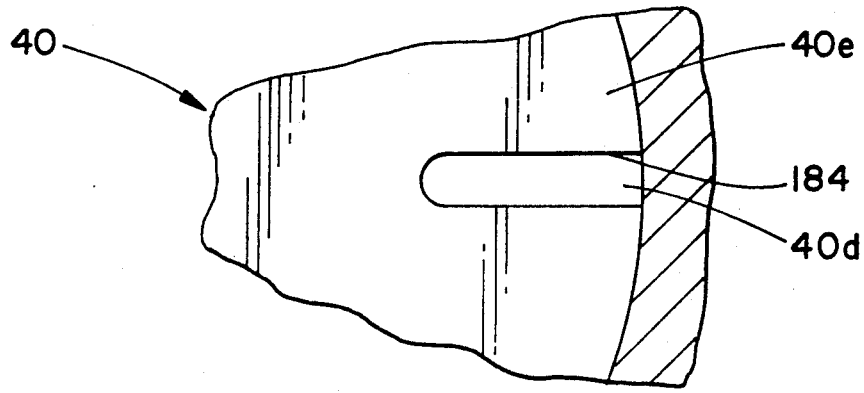
FIG. 7 is a view taken on line 7—7 of FIG. 5.

The presence of openings 182 makes it important that diaphragm 40 be installed with the proper orientation. As can be understood, if installed in an inverted position with openings 182 opening into the valve chamber 18, the diaphragm would behave in the manner of a prior diaphragm with a fatigue crack in the lower four layers, i.e., the lower four layers would be biased down toward the seat surface 54. For this reason, means are provided to reduce the chances of inadvertent improper installation of the diaphragm, and to prevent the valve from passing a leak test if the diaphragm is improperly installed. The means can take various forms. In the subject embodiment, it comprises a grove or peripheral recess opening 184 which extends into the outer surface of diaphragm layer 40e as best seen in FIG. 7. Of course, the recess 184 extends axially into the diaphragm only a short distance such as through only one or two of the plies. The radial extent of opening 184 is, however, such that if the diaphragm assembly is put in place upside down, the opening will extend over the seal bead 42a of ring 42. This prevents ring 42a from forming a seal with the diaphragm. Thus, when the valve is leak tested, the improperly installed diaphragm is readily apparent.

The invention has been described with reference to the preferred embodiment. Obviously, modifications and alterations will occur to others upon a reading and understanding of this specification. It is intended to include all such modifications and alterations insofar as they come within the scope of the appended claims or the equivalents thereof.

Having thus described the invention, it is claimed:

1. A valve comprising:
   a valve body defining a valve chamber having inlet and outlet ports connecting the chamber with the exterior of the body;
   a valve element for controlling flow through the chamber between the inlet and outlet ports;
   an expansible fluid motor operator assembly including a housing carrying a reciprocated element for moving the valve element between open and closed positions, the operator assembly further including a bonnet connected to the housing with the reciprocated element extending therethrough and a connector member releasably connecting the bonnet member to the valve body, adjustment means associated with the bonnet member for permitting adjustment of the bonnet member relative to the housing to adjust the distance the reciprocated element extends from the bonnet to control the force to be applied to the valve element prior to the assembly of the operator assembly to the valve body and lock means for fixing the adjustment means in a predetermined position, said lock means being incapable of being released when the bonnet member is connected to the valve body to prevent adjustment of the stroke of the reciprocated element without disconnecting the operator assembly from the valve body.

2. A valve as defined in claim 1 wherein the operator assembly includes a base member of the housing releasably joined to the bonnet member.

3. A valve as defined in claim 2 wherein the adjustment means comprises a threaded connection between the base member and the bonnet member.

4. A valve as defined in claim 3 wherein the lock means comprises a selectively operable member for preventing movement of the threaded connection between the base member and the bonnet member.

5. A valve as defined in claim 4 wherein said connector comprises a female nut which encircles the bonnet and threadedly engages the body and overlies the lock means.

6. A valve as defined in claim 1 wherein the connector is positioned to block access to the lock means when the bonnet member is connected to the valve body.

7. A valve as defined in claim 1 wherein the bonnet member is received in the valve body and the connector comprises a female nut which threadedly engages the valve body.

8. A valve as defined in claim 1 including a fluid motor cylinder and wherein the adjustment means comprises means for permitting selective movement of the bonnet member relative to the fluid motor cylinder.

* * * * *